United States Patent
Setterberg et al.

(10) Patent No.: US 9,613,428 B2
(45) Date of Patent: Apr. 4, 2017

(54) FINGERPRINT AUTHENTICATION USING STITCH AND CUT

(71) Applicant: FINGERPRINT CARDS AB, Göteborg (SE)

(72) Inventors: Eric Setterberg, Västra Frölunda (SE); Hamid Sarvé, Göteborg (SE); Kenneth Jonsson, Kungälv (SE)

(73) Assignee: FINGERPRINT CARDS AB, Göteborg (SE)

( * ) Notice: Subject to any disclaimer, the term of this patent is extended or adjusted under 35 U.S.C. 154(b) by 0 days.

(21) Appl. No.: 14/922,748

(22) Filed: Oct. 26, 2015

(65) Prior Publication Data
US 2016/0132710 A1    May 12, 2016

(30) Foreign Application Priority Data
Nov. 7, 2014   (SE) .................................... 1451337

(51) Int. Cl.
*G06K 9/00* (2006.01)
*G06T 7/00* (2017.01)

(52) U.S. Cl.
CPC ........ *G06T 7/0097* (2013.01); *G06K 9/00026* (2013.01); *G06K 9/00087* (2013.01)

(58) Field of Classification Search
CPC ........... G06K 9/00026; G06K 9/00067; G06K 9/00087; G06K 9/00073; G06F 21/32; G06T 7/0097
See application file for complete search history.

(56) References Cited

U.S. PATENT DOCUMENTS

| 6,075,905 | A | 6/2000 | Herman et al. |
| 6,668,072 | B1 | 12/2003 | Hribernig et al. |
| 7,142,699 | B2 * | 11/2006 | Reisman ............ G06K 9/00087 283/69 |
| 2003/0002718 | A1 | 1/2003 | Hamid |
| 2005/0129291 | A1 * | 6/2005 | Boshra ............... G06K 9/00026 382/124 |
| 2005/0185828 | A1 | 8/2005 | Semba et al. |
| 2005/0238212 | A1 | 10/2005 | Du et al. |

(Continued)

FOREIGN PATENT DOCUMENTS

| EP | 1306804 B1 | 1/2010 |
| WO | 0068873 A1 | 11/2000 |

OTHER PUBLICATIONS

Nandakumar, Karthik, and Anil K. Jain. "Local Correlation-based Fingerprint Matching." ICVGIP. 2004, pp. 1-6.*

(Continued)

*Primary Examiner* — Jonathan S Lee
(74) *Attorney, Agent, or Firm* — Remarck Law Group PLC

(57) ABSTRACT

The present invention concerns a method, a system, a device of authenticating a user using a body part including biometric information. The method comprises stitching partial enrolment images comprising different views of the user's body part into at least one mosaic and thereby creating an enrolled image, acquiring an authentication image of the body part, wherein the size of the authentication image is a fraction of the enrolled image, determining at least one area of interest in the enrolled image, and matching the authentication image with image data of the determined area of interest in the enrolled image.

12 Claims, 5 Drawing Sheets

(56) References Cited

U.S. PATENT DOCUMENTS

| | | | |
|---|---|---|---|
| 2006/0285729 A1* | 12/2006 | Kim | G06K 9/00026 382/124 |
| 2012/0174213 A1* | 7/2012 | Geiger | G06F 21/32 726/19 |
| 2012/0304267 A1* | 11/2012 | Yamada | G06K 9/00006 726/7 |
| 2013/0259330 A1 | 10/2013 | Russo et al. | |
| 2014/0002240 A1* | 1/2014 | Marciniak | G06K 9/00885 340/5.83 |
| 2014/0003677 A1 | 1/2014 | Han et al. | |
| 2014/0003679 A1 | 1/2014 | Han et al. | |
| 2014/0003681 A1 | 1/2014 | Wright et al. | |
| 2016/0063298 A1* | 3/2016 | Tuneld | G06K 9/00013 348/77 |
| 2016/0078274 A1* | 3/2016 | Tuneld | G06K 9/0002 382/124 |
| 2016/0132711 A1* | 5/2016 | Setterberg | G06K 9/0002 382/124 |
| 2016/0307023 A1* | 10/2016 | Kim | G06K 9/00087 |
| 2016/0321494 A1* | 11/2016 | Shin | G06K 9/00013 |

OTHER PUBLICATIONS

Chan, Ka Cheong, Yiu Sang Moon, and P. S. Cheng. "Fast fingerprint verification using subregions of fingerprint images." Circuits and Systems for Video Technology, IEEE Transactions on 14.1 (2004): 95-101.*
Wen, Wen, et al. "A Robust and Efficient Minutia-Based Fingerprint Matching Algorithm." Pattern Recognition (ACPR), 2013 2nd IAPR Asian Conference on. IEEE, 2013.*
Kyoungtaek Choi et al., "Fingerprint Mosaicking by Rolling and Sliding," Audio-and Video-Based Biometric Person Authentication; Lecture Notes in Computer Science; LNCS, Jun. 28, 2005 Springer-Verlag, Berlin-Heidelberg, ISBN 978-3-540-27887-0, ISBN 3-540-27887-7, 10 pages.
PCT International Search Report dated Feb. 24, 2016 for PCT International Application No. PCT/SE2015/051170 (6 pages).
PCT International Search Report dated Feb. 24, 2016 for PCT International Application No. PCT/SE2015/051171 (5 pages).
U.S. Appl. No. 14/922,848, filed Oct. 26, 2015, Setterberg.

* cited by examiner

FINGERPRINT AUTHENTICATION USING STITCH AND CUT

CROSS-REFERENCE TO RELATED APPLICATIONS

This application claims the benefit of Swedish Patent Application No. 1451337-8, filed Nov. 7, 2014. The disclosure of the above application is incorporated herein by reference in its entirety.

TECHNICAL FIELD

The present disclosure relates to a method, a system, a device for fingerprint authentication using small fingerprint sensors. More particularly the invention pertains to a method, a system, a device of authenticating a user using a body part including biometric information.

BACKGROUND

In the field of biometric sensing, the use of fingerprints has evolved to be one of the most widely used technologies. There are many electronic devices which require fingerprint authentication before a user is allowed access to the device. This fact can be illustrated and exemplified by considering the field of mobile communication technology, e.g. the use of intelligent mobile devices such as smartphones. In this field there is an increased demand for providing increased security for accessing the devices themselves and also for providing secure access to remote services such as banking services that are available via data communication networks.

In order to enable such secure access by way of fingerprint sensing, a user has to take part in a so-called enrolment procedure where information directly connected to a user's fingerprint is registered for later use in a matching procedure when actual access is to be determined. During such an enrolment procedure, the user is typically prompted to apply a finger to a fingerprint sensor several times until a complete fingerprint, or at least a large part of a fingerprint, has been recorded.

Examples of prior art fingerprint enrolment are described in US patent application publications 2014/0003677 and 2014/0003679. In the systems described in these publications, during the enrolment procedure, a user is provided with feedback in the form of information that tells the user which part of the fingerprint that is still to be recorded.

A fingerprint sensor is for example a capacitive touch sensor which uses electrical current when scanning a finger as opposed to an optical scanner which uses light. The capacitive touch sensor is either passive or active. A passive sensor measures the capacitance between the sensor and the finger at each sensor pixel. The capacitance is different for ridges and valleys in the fingerprint since there is an air gap between the valley and the sensor. An active sensor uses a charging cycle to apply a voltage to the skin before measurement. The electric field between the finger and the sensor follows the pattern of the ridges. An advantage with an active sensor is that neither the finger nor the sensor needs to be clean during the scanning.

During fingerprint authentication with a capacitive touch sensor a big enough area of the skin presented to the sensor must be overlapping with the area of skin presented to the sensor at enrollment, otherwise the authentication becomes impossible. The standard way of ensuring that the overlapping is enough is to let the enrollment consist of a procedure where the user applies his fingers multiple times on the sensor in different angles so that more and more skin area is covered in the enrolled images.

At authentication typically only one touch is used and the information extracted from this frame is then matched with the enrolled information. A matching algorithm is used to compare the enrolled images with the authentication image. The matching algorithm may be an image based algorithm where the authentication image is graphically compared to the enrolled images. The matching algorithm may also compare certain features of the authentication image and the enrollment images. Feature recognition is then performed on the images to extract the minutiae, i.e. the major features, of the fingerprint. The minutiae are for example ridge ending, ridge bifurcation, short ridge, island, ridge enclosure, spur, crossover, delta and core.

The matching used is typically not tuned to large differences between the area coverage of the enrolled information and the area coverage of the information used for authentication. If, during the feature comparison step of the matching process, there is an unbalance between the number of features enrolled and the number of features extracted from the authentication image, then the result of the comparison will be that these feature sets does not compare well. The reason behind this is that for impostor attempts on large sensors, partially obscured fingerprint should not be easier to match. To retain this characteristic of the matcher and to make sure that enough features are matched to prevent impostor attempts with partial prints, extraction is performed on the enrollment images one by one resulting in an ensemble or set of templates. When matching is performed the data extracted from the authentication image is then compared to each of these templates and the final matching score is computed from these individual match scores with some method, using for example maximum value or mean value.

One drawback of the abovementioned methodology is when the location of an authentication image is in between two or more enrollment images. All the needed information is enrolled but not enough in one single template.

Some small capacitive touch sensors also have elongated shape. When matching information derived from images acquired by such sensors, the maximum overlap is very sensitive to rotation of the finger. If, for instance, such a sensor is 4×10 mm the maximum overlap of images from a finger with the same orientation is the full 40 mm$^2$ but if the orientation differs with 90 degrees then the maximum overlap is reduced to just 4×4=36 mm$^2$.

The problems with ensuring that there is enough overlap between the enrollment images and the authentication image are especially prominent when the authentication system does not have any hardware guidance for the finger. Such is typically the case when the system is used with for example a Smartphone.

There is a need for a system which optimizes the fingerprint authentication system to perform better matches when the authentication image is not well aligned with the enrolled images.

There is also a need for a system which simplifies and optimizes the fingerprint authentication system to save computational power and to speed up the process.

SUMMARY

An object of the present disclosure is to provide a method, a system and a device which seeks to mitigate, alleviate, or eliminate one or more of the above-identified deficiencies in the art and disadvantages singly or in any combination.

These and further objects are achieved by a method, a system and a device for authenticating a user using a body part including biometric information.

The present disclosure is defined by the appended claims. Various advantageous embodiments of the disclosure are set forth by the appended claims as well as by the following description and the accompanying drawings.

According to some aspects the disclosure provides for a method in a biometric sensing system of authenticating a user using a body part including biometric information.

According to some aspects, the method comprises stitching partial enrolment images comprising different views of the user's body part into at least one mosaic and thereby creating an enrolled image, acquiring an authentication image of the body part, wherein the size of the authentication image is a fraction of the enrolled image, determining at least one area of interest in the enrolled image and matching the authentication image with image data of the determined area of interest in the enrolled image, and thereby enabling authentication of the user. By creating at least one mosaic of the partial enrolment images and thus creating an enrolled image, the authentication image can be matched against just one image. Since the authentication image is smaller than the enrolled image, a partial area of the enrolled image must be determined so that the authentication can be matched against that. The partial area is an area of interest is determined that it is likely that the authentication image is matching. An advantage with this method is that it does not matter if the authentication image is rotated compared to the partial enrolment images since the matching is performed on the at least one mosaic, i.e. the enrolled image. A further advantage is that it will not matter if the authentication image is located on the edges of two different partial enrolment images since they will be the same in the enrolled image. Yet a further advantage is that computational power and time is saved by just needing to match the authentication image with one image instead of all partial enrolment images.

According to some aspects, the determining comprises estimating candidate areas of the authentication image in the enrolled image by comparing features in the authentication image with features in the enrolled image. By comparing features in the authentication image and the enrolled image, the area of interest in the enrolled image can be located. Feature comparison in fingerprint images is an efficient way of comparing images.

According to some aspects, the difference in size between the area of interest and the area of the authentication image is below a tolerance value of a matcher. In other words, it is ensured that the matcher can compare the area of interest and the authentication image.

According to some aspects, the method comprises enrolling several partial enrolment images comprising different views of the body part. Enrolling is performed to acquire the partial enrolment images so that the enrolled image is obtainable.

According to some aspects, the enrolling comprises capturing partial enrolment images in a sequence in time using a two dimensional biometric sensor. In other words, the sensor is used to sequentially capture the partial enrolment images. In this way only one sensor is needed to acquire the partial enrolment images and thus also the enrolled image.

According to some aspects, the acquiring comprises capturing an authentication image using a two dimensional biometric sensor. Using a two dimensional biometric sensor is a cheap and good way to acquire an authentication image.

According to some aspects, the method comprises copying the image data of the area of interest and storing the copied data in the biometric sensing system. By storing a copy of the area of interest, the size of the stored copied image may be chosen to match that of the authentication image. The matching is then performed optimally on two images of similar size.

According to some aspects, the matching of the images comprises: forming at least one enrolment template by performing feature extraction on the image data of the area of interest, forming a candidate template by performing feature extraction on the authentication image and matching the candidate template with the enrollment template. By matching a candidate template and an enrollment template with extracted features, an efficient and precise way of matching is performed.

According to some aspects, the biometric data is a fingerprint. Thus, the system can be used as a fingerprint authentication system.

According to some aspects the disclosure provides for a biometric sensing system configured to authenticate a user using a body part including biometric information.

According to some aspects, the biometric sensing system comprises a two-dimensional biometric sensor configured to generate an image of the body part and a processing circuitry. The processing circuitry is configured to stitch partial enrolment images comprising different views of the user's body part into at least one mosaic and thereby creating the enrolled image, acquire, using the two-dimensional biometric sensor, the authentication image of a body part, wherein the size of the authentication image is a fraction of the enrolled image, determine at least one area of interest in the enrolled image, and match the authentication image with image data of the determined area of interest in the enrolled image. The advantages of the steps have been previously described.

According to some aspects the two-dimensional biometric sensor is a capacitive touch sensor. Capacitive touch sensors are small and cheap and provide a good fingerprint image when a finger is scanned.

According to some aspects the disclosure provides for a portable electronic device comprising the biometric sensing system according to above.

According to some aspects the disclosure provides for a computer readable program, which, when executed on a portable electronic device, causes the portable electronic device to perform the method above.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
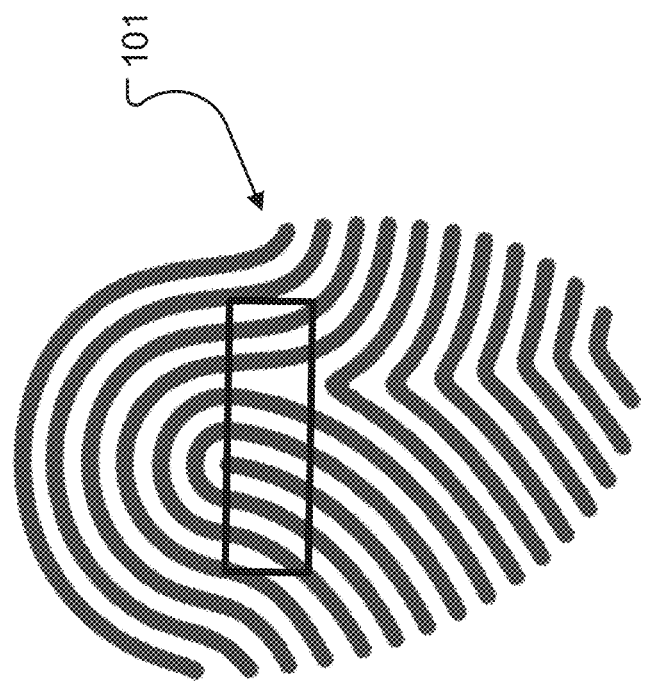
FIG. 1 illustrates a fingerprint, partial enrolment images of that fingerprint and an authentication image of that fingerprint.
Figure 1:
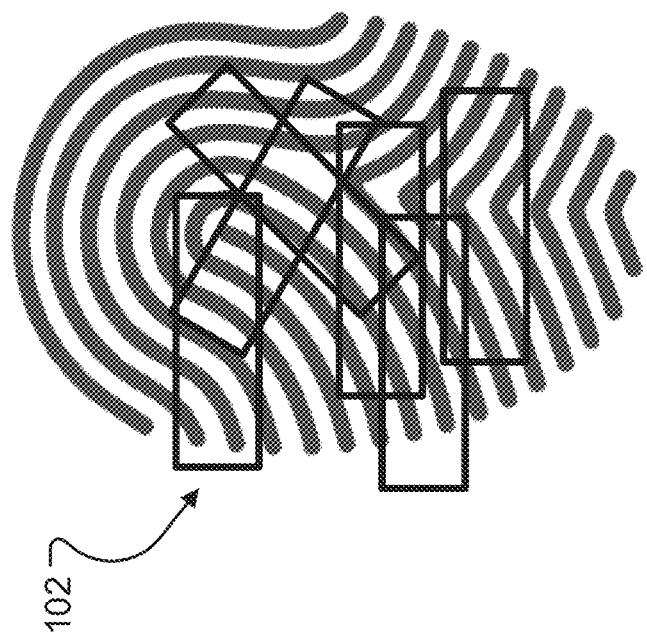

Aspects of the present disclosure will be described more fully hereinafter with reference to the accompanying drawings. The method, system and device disclosed herein can, however, be realized in many different forms and should not be construed as being limited to the aspects set forth herein. Like numbers in the drawings refer to like elements throughout.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments of the present invention will be exemplified using a portable communication device such as a mobile phone. However, it should be appreciated that the invention is as such equally applicable to any electronic devices which have biometric sensing capabilities. Examples of such devices may for instance be any type of mobile phone, smartphone, laptop (such as standard, ultra portables, netbooks, and micro laptops) handheld computers, portable digital assistants, tablet computers, touch pads, gaming devices, accessories to mobile phones, e.g. wearables in the form of headphones/-sets, visors/goggles, bracelets, wristbands, necklaces, etc. For the sake of clarity and simplicity, the embodiments outlined in this specification are exemplified with, and related to, mobile phones.

As discussed in the background, enrolment images are needed to have something to compare the authentication image with. Multiple images are acquired during enrollment. Apart from some outliers these images can be stitched into one or more larger mosaics. Mosaics are created by stitching images using conventional stitching algorithms. Stitching of images is when several images are combined into one. Images that have overlapping fields of view can be stitched into one combined image. One way to stitch images is to recognize geometrical features of the images to be stitched and then put them together so that the geometrical features overlap.

U.S. Pat. No. 6,075,905A discloses a method and apparatus for mosaic image construction. The method consists of an initial alignment of the images to be stitched, establishment of a coordinate system for the image mosaic, alignment of the images to the coordinate system and then merging the aligned images to form the mosaic. Alignment is in general achieved through image processing techniques that automatically find image transformations (e.g., translation, rotation, scale) that bring patterns in overlapping images into precise alignment.

U.S. Pat. No. 6,668,072B discloses a method for producing a reference image for pattern recognition tasks. In this document symbolic intermediate representations for each image of the pattern are produced and compared to determine relative shift and rotation with respect to each other. The intermediate representations are synthesized if the quality of a match is adequate.

FIG. 1 illustrates the problem with matching authentication images 101 to captured partial enrolment images 102. The authentication image is located in between several captured partial enrolment images and thus a user may receive a false negative from the matching.

The proposed technique solves this problem by creating at least one mosaic from to captured partial enrolment images 102 and then cutting out an image representing a probable position of the authentication image from the mosaic. The authentication is then performed by comparing or matching an authentication image with the "cut out". The technique will now be explained in further detail referring to FIGS. 2 to 5.

Figure 2:
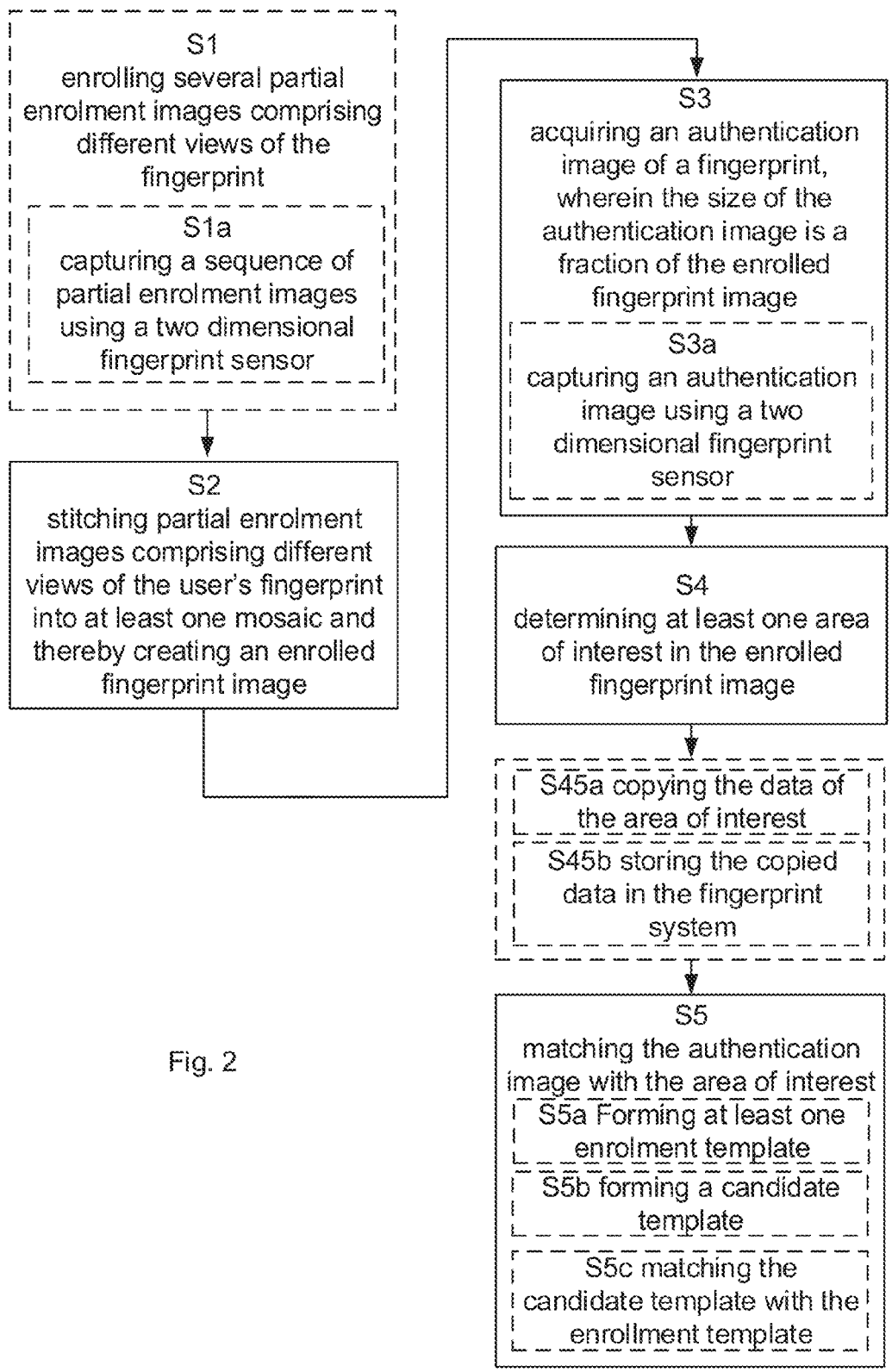
FIG. 2 is a flow chart illustrating the proposed method.
Figure 3:
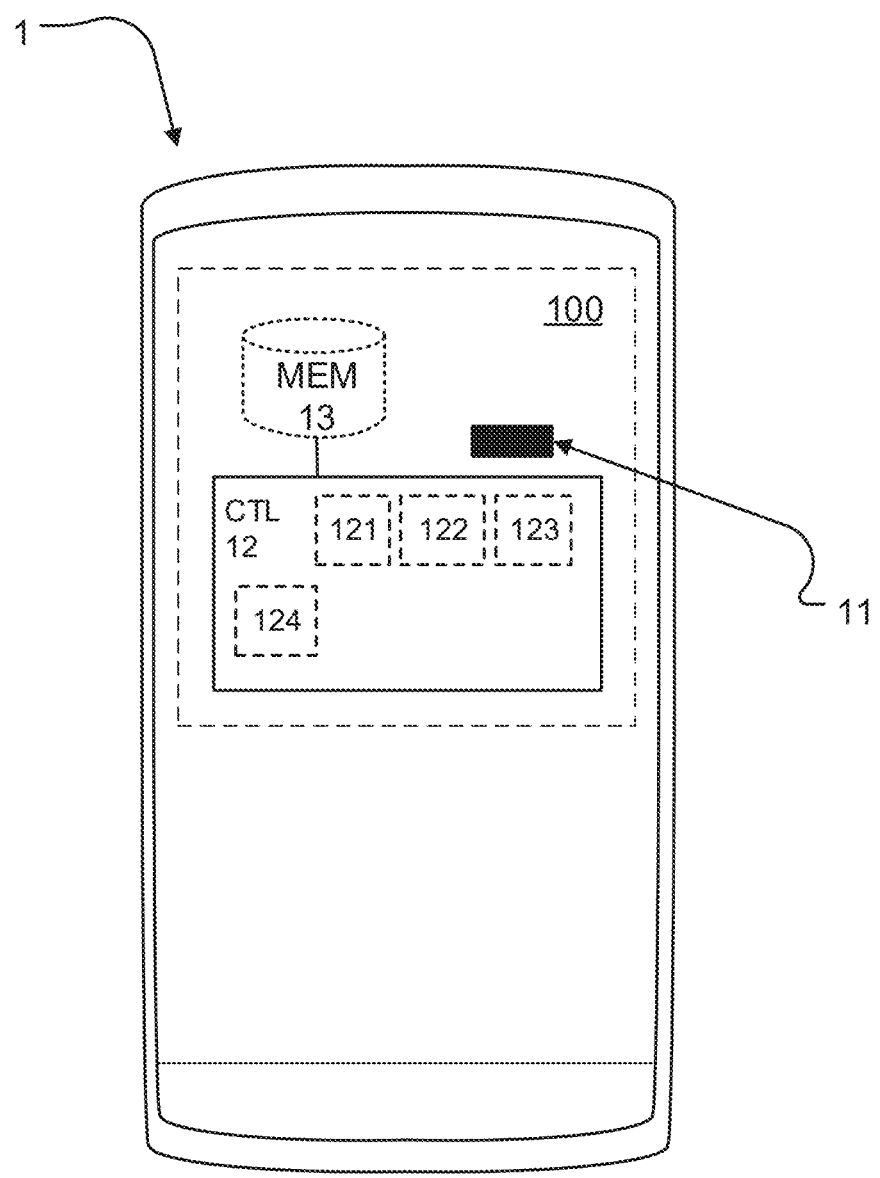
FIG. 3 is an example embodiment of a mobile phone with a two-dimensional sensor.

FIG. 2 is a flow diagram depicting example operations which may be performed by a biometric sensing system 100 configured to authenticate a user using a body part including biometric information. A portable electronic device 1 comprising a biometric sensing system is illustrated in FIG. 3. The biometric sensing system 100 comprises a two-dimensional biometric sensor 11 configured to generate an image of the body part and a processing circuitry 12. A biometric sensing system on a portable electronic device may be used to, for example, unlock the device for use by a specific user. Another implementation is to authenticate the user when the portable electronic device is handling sensitive information, such as handling bank information or other sensitive personal information.

It should be appreciated that FIG. 2 comprise some operations which are illustrated with a solid border and some operations which are illustrated with a dashed border. The operations which are comprised in a solid border are operations which are comprised in the broadest example embodiment. The operations which are comprised in a dashed line are example embodiments which may be comprised in, or a part of, or are further operations which may be taken in addition to the operations of the broader example embodiments. It should be appreciated that the operations need not be performed in order. Furthermore, it should be appreciated that not all of the operations need to be performed.

The method illustrated in FIG. 2 comprises stitching S2 partial enrolment images 102, 402, 502 comprising different views of the user's body part into one or more mosaics and thereby creating an enrolled image 303. The processing circuitry is configured to stitch S2 partial enrolment images 102, 402, 502 comprising different views of the user's body part into the mosaic. According to some aspects, the processing circuitry comprises a stitcher 121 for the stitching. In other words, the enrolled image comprises one or more mosaics. The partial enrolment images are representations of the body part that has been scanned by the sensor during enrolment. The enrolled image is either directly stitched together from the partial enrolment images or extracted features of the partial enrolment images are stitched together to form an enrolled image comprising extracted features. When the enrolled image comprises stitched features, the extracted features are stitched together to form a mosaic in feature space. Features are in that case extracted on the partial enrolment images during a feature extraction operation before stitching. Extracting features from an image is known to the skilled person in image processing. Examples of extraction feature types are local descriptions of shape and texture. When performing stitching it is preferred to have a good spread of the features so that the images are stitched correctly everywhere. According to some aspects, the enrolled image comprises one mosaic of features and one mosaic of the images.

Figure 4:
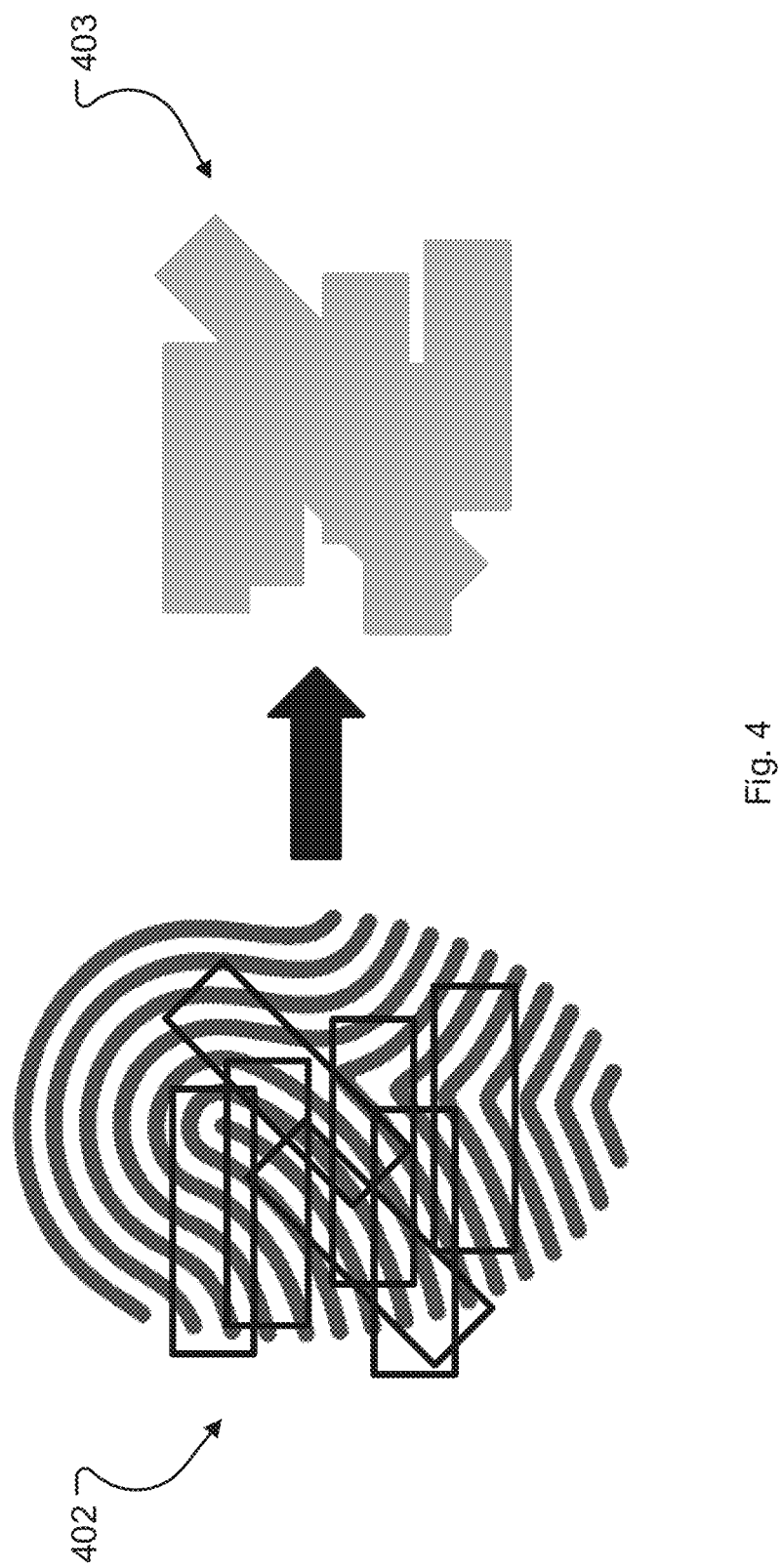
FIG. 4 illustrates a fingerprint with partial enrolment images and a mosaic of the partial enrolment images.

If the sensor is for example a capacitive sensor, the images are formed by processing the difference in capacitance at different locations over time at the sensor. The difference in capacitance is normally illustrated as a grayscale image wherein the brightness of the pixels represents the distance of the skin from that part of the sensor. Thus in the image ridges will be dark and the valleys between them whiter representing the difference in capacitance. Examples of stitching have been previously described. FIG. 4 illustrates when captured images 402, also referred to as the partial enrolment images 402, are stitched into a mosaic 403.

The following step in FIG. 2 comprises acquiring S3 an authentication image 201, 501 of the body part, wherein the size of the authentication image is a fraction of the enrolled image. The processing circuitry is configured to acquiring S3 the authentication image. According to some aspects, the processing circuitry comprises an acquirer 122 for acquiring the authentication image. Thus the authentication image is captured for matching.

Furthermore, the method comprises determining S4 at least one area of interest 504 in the enrolled image and matching S5 the authentication image with image data of the determined area of interest in the enrolled image, and thereby enabling authentication of the user. The processing circuitry is configured to determine S4 the at least one area of interest and to match S5 the authentication image with image data of the determined area of interest. According to some aspects, the processing circuitry comprises a determiner 123 for the determination and a matcher 124 for the matching. The matching typically generates a score that is e.g. compared to a threshold value in order to determine if the user is the claimed user. Hence, the method further comprises authenticating the user based on the matching or rather based on the output of the matching, not shown.

By creating one or more mosaics of the partial enrolment images and thus creating an enrolled image, the authentication image can be matched to just one image. Since the authentication image is smaller than the enrolled image, a partial area of the enrolled image may be determined so that the authentication is matched against that. The area of interest 504 is selected to provide an area in the enrolled image to match the authentication image with. Another term for area of interest is region of interest. According to some aspects, the area of interest is determined by performing feature extraction on the enrolled image and the authentication image. In the case where the enrolled image comprises one mosaic of features and one mosaic of the images, the feature extraction is not needed since there already exist an enrolled image with extracted features. Then the features are compared and areas in the enrolled image which have many features in common with the authentication image are chosen as areas of interest. "Features in common" here means that the features correspond in similarity and in geometrical configuration. According to some aspects the area of interest is cut out of the enrolled image and the cut out is used in the matching. Note that the types of features used when locating the area of interest and when matching may be different. When locating an area of interest it may be most effective to use one type of feature and when matching another type of features may be better. Features are for example local descriptions of shape and texture.

Figure 5A:
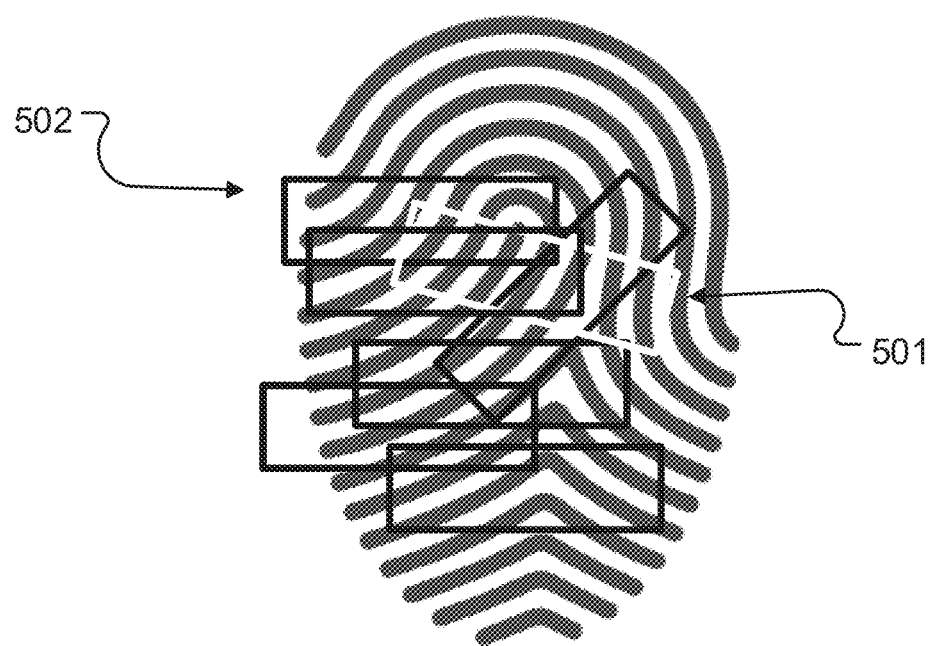
FIG. 5a illustrates a fingerprint and partial enrolment images of that fingerprint and an authentication image of the fingerprint.
Figure 5B:
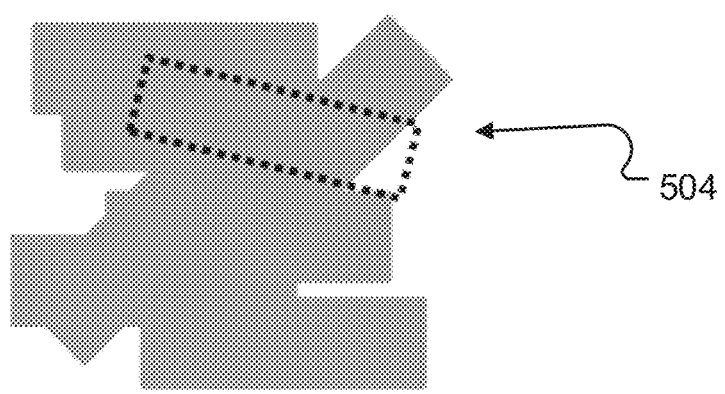
FIG. 5b illustrates a mosaic of the partial enrolment images and an area of interest in the mosaic.

FIG. 5 illustrates the proposed method. In FIG. 5a an authentication image 501 and a number of partial enrolment images 502 are shown. However, as can be seen the overlap between the authentication image 501 and any individual partial enrolment image 502 is small. Hence, there is a risk that no match will be detected, even though the images show the same fingerprint. This is overcome by instead using a "cut out", i.e. an area of interest, to compare the authentication image with, as shown in FIG. 5b.

An advantage with this method is that it does not matter if the authentication image is rotated compared to the partial enrolment images since the matching is performed on the mosaic, i.e. the enrolled image. A further advantage is that it will not matter if the authentication image is located on the edges of two different partial enrolment images since they will be the same in the enrolled image. Yet a further advantage is that computational power and time is saved by just needing to match the authentication image with one image instead of all partial enrolment images.

When an authentication image 101 is captured of a body part of the user, it is compared, or matched, to the enrolled image. If only the partial enrolment images are used during the comparison there is a risk that the comparison will result in a false negative due to for example rotation of the authentication image compared to the partial enrolment images. So the method constructs one or more mosaics that represent all of the partial enrolment images. Thereby the chance of matching when the authentication image is not well aligned with the original set of partial enrolment images is increased. In this way, for example problems with translational quantization effects are overcome. If the system, during the capturing of images representing different views of the body part, captures two images where one covers the right side of the body part and the other cover the left side, the enrolled image will contain both the right and the left side and thus matching with the authentication image is enabled and simplified even if the authentication image is a view of the middle of the body part.

To use an enrolled image for authentication is an efficient way of minimizing storage space since each enrolled template image takes up storage space and in this way, only the enrolled image needs to be stored. It also minimizes false positives; each partial enrolment template used in matching increases the chance of false positives because impostors are given more chances of success. It also maximizes chances of matching since the authentication image is matched against all of the area of the body part that has been scanned previously.

According to some aspects, if an authentication image is matched to the enrolled image and it is determined that the authentication image matched the enrolled image, the authentication image and/or features extracted therefrom are added to the enrolled image. Thereby the area of the enrolled image may increase over time of use of the system.

To find the areas of interest, the determining S4 comprises, according to some aspects, estimating candidate areas of the authentication image in the enrolled image by comparing features in the authentication image with features in the enrolled image. By comparing features in the authentication image and the enrolled image, the area of interest in the enrolled image can be located. Feature comparison in fingerprint images is an efficient way of comparing images. In other words, the area of interest in the enrolled image is where the most features are the same in both the enrolled image and the authentication image. In other words, it is where features correspond in similarity and in geometrical configuration.

It depends on the matching technique used if the whole area of the enrolled image can be used as an area of interest or if there is a need to extract a part of the enrolled image for matching. According to some aspects, the difference in size between the area of interest and the area of the authentication image is below a tolerance value of a matcher. In other words, it is ensured that the matcher can compare the area of interest and the authentication image. This depends on the type of matcher used. Traditional matchers typically employ a score function that includes information about the percentage of successfully relocalised features. These matchers are often sensitive to unbalanced feature sets, i.e. when matching a feature set with a low feature count with another feature set with a high feature count. There are matchers that are designed to be invariant to the feature count and those are less vulnerable to scenarios with differences in feature count.

As discussed in the background, images of a body part of a user need to be enrolled into the system before it can be used for authentication. According to some aspects, the method comprises enrolling S1 several partial enrolment images comprising different views of the body part. Enrolling is performed to acquire the partial enrolment images so that the enrolled image is obtainable.

There are several different kinds of sensors that produce images of body parts used for authentication of a user. According to some aspects, the enrolling S1 comprises capturing S1a partial enrolment images in a sequence in time using a two dimensional biometric sensor 11. In other words, the two dimensional sensor is used to sequentially capture the partial enrolment images. In this way only one sensor is needed to acquire the partial enrolment images and thus also the enrolled image. According to some aspects, the acquiring S3 comprises capturing S3a an authentication image using a two dimensional biometric sensor 11. Using a two dimensional biometric sensor is a cheap and good way to acquire an authentication image. The two dimensional biometric sensor used for enrolling and acquiring may and may not be the same sensor. According to some aspects the user of the system has enrolled his/her partial enrolment images on another device than on the one he/she uses for authentication.

According to some aspects, the method comprises copying S45a the image data of the area of interest and storing S45b the copied data in the biometric sensing system. By storing a copy of the area of interest, the size of the stored copied image may be chosen to match that of the authentication image. The matching is then performed optimally on two images with sizes to suit the matcher. Alternatively, the image data is data representing extracted features of the area of interest. Feature extraction has been described in the background and is known to a person skilled in the art and will not be explained further.

According to some aspects, the matching S5 of the images comprises: forming S5a at least one enrolment template by performing feature extraction on the image data of the area of interest, forming S5b a candidate template by performing feature extraction on the authentication image and matching S5c the candidate template with the enrollment template. By matching a candidate template and an enrollment template with extracted features, an efficient and precise way of matching is performed. According to some aspects, it is determined that a match is found if a measurement of similarity is above a threshold value. In other words, if a similarity measurement between the candidate template and the enrolment template is above a threshold value, the system determines that the authentication image is a match and the user is authenticated; i.e. that registered biometric data for the authentication image corresponds to that of captured images.

Note that the features used in the matching S5 are not necessary the same type of features as the features used in the stitching S2 or determination S4 of the area of interest. However, the same type of features or partly the same type of features may be used.

According to some aspects, the biometric data is a fingerprint. Thus, the system can be used as a fingerprint authentication system.

According to some aspects the two-dimensional biometric sensor 11 is a capacitive touch sensor. Capacitive touch sensors are small and cheap and provide a good fingerprint image when a finger is scanned. Capacitive touch sensors have been discussed in the background and are known to a person skilled in the art.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented according to some aspects by a computer program, comprising computer readable code which, when run on an electronic device, causes the electronic device to perform the method according to above. The computer program, embodied in a computer-readable medium, includes computer-executable instructions, such as program code, executed by computers in networked environments. A computer-readable medium may include removable and non-removable storage devices 13 including, but not limited to, Read Only Memory, ROM, Random Access Memory, RAM, compact discs, CDs, digital versatile discs, DVD, etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A method in a biometric sensing system comprising a two-dimensional biometric sensor of authenticating a user using a body part including biometric information, the method comprising:
   stitching partial enrolment images comprising different views of the user's body part into one or more mosaics and thereby creating a single enrolled image, wherein each partial enrolment image corresponds to a single and separate touch of the body part on the two-dimensional biometric sensor,
   acquiring an authentication image of the body part, wherein: (i) the authentication image corresponds to a single touch of the body part on the two-dimensional biometric sensor and has an area, and (ii) a size of the authentication image is a fraction of the enrolled image,
   determining at least one area of interest in the enrolled image that corresponds to the authentication image by comparing features in the authentication image with features in the enrolled image, wherein a difference in size between the at least one area of interest and the area of the authentication image is below a tolerance value, and
   matching the authentication image with the enrolled image by using a matching algorithm to compare the authentication image with image data of the determined at least one area of interest in the enrolled image, and thereby enabling authentication of the user.

2. The method according to claim 1, wherein the determining comprises estimating candidate areas of the authentication image in the enrolled image by comparing features in the authentication image with features in the enrolled image.

3. The method according to claim 1, comprising:
   enrolling several partial enrolment images comprising different views of the body part.

4. The method according to claim 3, wherein the enrolling comprises capturing partial enrolment images in a sequence in time using the two-dimensional biometric sensor.

5. The method according to claim 1, wherein the acquiring comprises capturing an authentication image using the two-dimensional biometric sensor.

6. The method according to claim 1, comprising:
   copying the image data of the at least one area of interest and storing the copied data in the biometric sensing system.

7. The method according to claim 1, wherein the matching of the images comprises:
   forming at least one enrolment template by performing feature extraction on the image data of the at least one area of interest,
   forming a candidate template by performing feature extraction on the authentication image, and
   matching the candidate template with the enrollment template.

8. The method according to claim 1, wherein the biometric data is a fingerprint.

9. A biometric sensing system configured to authenticate a user using a body part including biometric information, the biometric sensing system comprising:
   a two-dimensional biometric sensor configured to generate an image of the body part,
   a processing circuitry configured to:
      stitch partial enrolment images comprising different views of the user's body part into at least one mosaic and thereby creating a single enrolled image, wherein each partial enrolment image corresponds to a single and separate touch of the body part on the two-dimensional biometric sensor,
      acquire, using the two-dimensional biometric sensor, an authentication image of the body part, wherein: (i) the authentication image corresponds to a single touch of the body part on the two-dimensional biometric sensor and has an area, and (ii) a size of the authentication image is a fraction of the enrolled image,
      determine at least one area of interest in the enrolled image that corresponds to the authentication image by performing feature extraction on the enrolled image and the authentication image, wherein a difference in size between the at least one area of interest and the area of the authentication image is below a tolerance value, and
      match the authentication image with the enrolled image by using a matching algorithm to compare the authentication image with image data of the determined at least one area of interest in the enrolled image.

10. The biometric sensing system according to claim 9, wherein the two-dimensional biometric sensor is a capacitive touch sensor.

11. A portable electronic device comprising the biometric sensing system of claim 9.

12. A computer readable program, which, when executed on a portable electronic device, causes the portable electronic device to perform the method according to claim 1.

* * * * *